(12) United States Patent
DeLuca

(10) Patent No.: US 8,589,192 B2
(45) Date of Patent: Nov. 19, 2013

(54) TICKET SEGMENTATION

(76) Inventor: Lisa Seacat DeLuca, San Francisco, CA (US)

( * ) Notice: Subject to any disclaimer, the term of this patent is extended or adjusted under 35 U.S.C. 154(b) by 115 days.

(21) Appl. No.: 13/082,382

(22) Filed: Apr. 7, 2011

(65) Prior Publication Data

US 2011/0251862 A1 Oct. 13, 2011

Related U.S. Application Data

(60) Provisional application No. 61/323,189, filed on Apr. 12, 2010.

(51) Int. Cl.
*G06Q 10/00* (2012.01)
*G06Q 50/00* (2012.01)

(52) U.S. Cl.
USPC .................................................. 705/5

(58) Field of Classification Search
USPC .......................................... 705/5–6
See application file for complete search history.

(56) References Cited

U.S. PATENT DOCUMENTS

| | | | |
|---|---|---|---|
| 6,609,658 B1 * | 8/2003 | Sehr ............................... | 235/384 |
| 6,704,713 B1 | 3/2004 | Brett | |
| 7,127,408 B2 | 10/2006 | Rosen | |
| 7,415,424 B1 * | 8/2008 | Donner ............................ | 705/5 |
| 2001/0018660 A1 * | 8/2001 | Sehr ................................ | 705/5 |
| 2002/0082969 A1 | 6/2002 | O'Keeffe et al. | |
| 2003/0236736 A1 | 12/2003 | Harmon et al. | |
| 2004/0006497 A1 | 1/2004 | Nestor et al. | |
| 2006/0277130 A1 | 12/2006 | Harmon | |
| 2007/0203764 A1 | 8/2007 | Kokubo | |
| 2008/0033771 A1 * | 2/2008 | Barry ............................... | 705/5 |
| 2008/0162211 A1 | 7/2008 | Addington | |
| 2008/0300925 A1 * | 12/2008 | Benson et al. .................... | 705/5 |
| 2009/0114721 A1 * | 5/2009 | Ponert ............................ | 235/382 |
| 2010/0082374 A1 | 4/2010 | Charania et al. | |
| 2010/0082491 A1 | 4/2010 | Rosenblatt et al. | |
| 2010/0217679 A1 | 8/2010 | Eckstein | |
| 2010/0312587 A1 * | 12/2010 | Benson et al. .................... | 705/5 |
| 2011/0029894 A1 * | 2/2011 | Eckstein ........................ | 715/753 |
| 2011/0040656 A1 | 2/2011 | Groetzinger et al. | |
| 2011/0178891 A1 * | 7/2011 | Charriere ..................... | 705/26.2 |
| 2012/0185394 A1 * | 7/2012 | Gelfand et al. ................ | 705/1.1 |

OTHER PUBLICATIONS

Ho, et al., Enhancing Revenue in College Sport Events by Practicing Yield Management and E-commerce, The Coastal Business Journal, vol. 3, No. 1, 2006, pp. 47-55.*
Barry Kahn. Qcue. company. http://qcue.com/. 2011. Austin, Texas.

* cited by examiner

*Primary Examiner* — Daniel Vetter

(57) ABSTRACT

Techniques to segment a ticket into at least two ticket segments for a customizable event experience are disclosed. Events can have natural break points or event segments such as innings, periods, quarters, halves, or acts. In accordance with the claimed subject matter, a ticket can be segmented into a ticket segment for each of the event segments. Event factors, progression, and demand information can be monitored to allow or deny access to a ticket segment, set pricing, filter ticket segments, or adjust ticket segments. Furthermore, as the event progresses, analysis can continue and the ticket segments can be dynamically updated accordingly.

20 Claims, 9 Drawing Sheets

TICKET SEGMENTATION

CROSS-REFERENCE TO RELATED APPLICATIONS

This application claims the benefit of U.S. Provisional Application Ser. No. 61/323,189, filed Apr. 12, 2010.

FIELD OF DISCLOSURE

The claimed subject matter relates generally to the field of ticketing and, more particularly, to the segmentation of a ticket into at least two segments for a customizable event experience.

BACKGROUND INFORMATION

Events have entertained spectators for centuries. An event might be a concert, an orchestra performance, a play, a show, a sporting event, or any other activity in which a group of individuals watch or participate. During each event, there can be event factors that affect the entertainment value of the event, such as: how close the score is, whether or not there are injuries, which participants are active, other statistics, and even the weather. For example, a baseball game in the pouring rain is likely to be less desirable then a baseball game on a hot summer day.

Tickets can have information about the event such as the date, time, geographical location, venue, subject, description or title as well as admission criteria such as a location, an area, a section, a row, a seat, a ticket number, or a price and often will include a barcode or other machine-readable representation of data. This data can be read to verify the authority and originality of the ticket. A ticket can be an electronic ticket or a paper ticket. A venue is a geographic location where the event takes place. A venue might be a stadium, an arena, a court, a pool, a park, vicinity, or a theater.

Often times the price of a ticket will vary depending on the location of the ticket within the venue. More desirable locations that can provide incentives such as a closer viewing perspective to the event are typically higher priced than those that offer obstructed views and less desirable locations. The admission criteria define the criteria needed to gain admission to a limited capacity or restricted entry location.

Currently, tickets provide information for a single individual or group of individuals which allow them to gain access to a single location as described on the ticket for the duration of the event.

BRIEF SUMMARY

The claimed subject matter discloses techniques for segmenting a ticket into multiple segments. Events typically have natural break points that occur throughout the duration of the event. A segment is located on either side of such a break point. For example, a basketball game is either broken up into two halves or four quarters depending on the rules specified for the level of play. In basketball, therefore, there can be either two or four segments respectively. A concert might have an opening act followed by the main performance. In this situation there can be two natural segments. If the performance also included an intermission the number of segments can increase to three: opening act, first part before intermission, last part after intermission. Additionally, the time before or after the event as well as the breaks or intermissions themselves can be considered event segments as well.

A ticket segment can include, but is not limited to, the event segment corresponding to the ticket segment, traditional ticket information such as the date, time, geographical location, venue, subject, description, title, or the competing entities as well as admission criteria such as a location, an area, a section, a row, a seat, a ticket number, or a price and often will include a barcode or other machine-readable representation of data representing the entire event or details specifically related to the segment.

In addition, during a typical event, progress can be dynamic, i.e. event information is frequently being updated as the event progresses. Another aspect of the claimed subject matter can include monitoring event progress. This event progress information can be combined with other event factors or demand and can be used to allow or deny access, set pricing, filter, or adjust ticket segments.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE SEVERAL VIEWS OF THE DRAWINGS

A better understanding of the claimed subject matter can be obtained when the following detailed description of the disclosed embodiments is considered in conjunction with the following figures, in which:

DETAILED DESCRIPTION

Figure 1A:
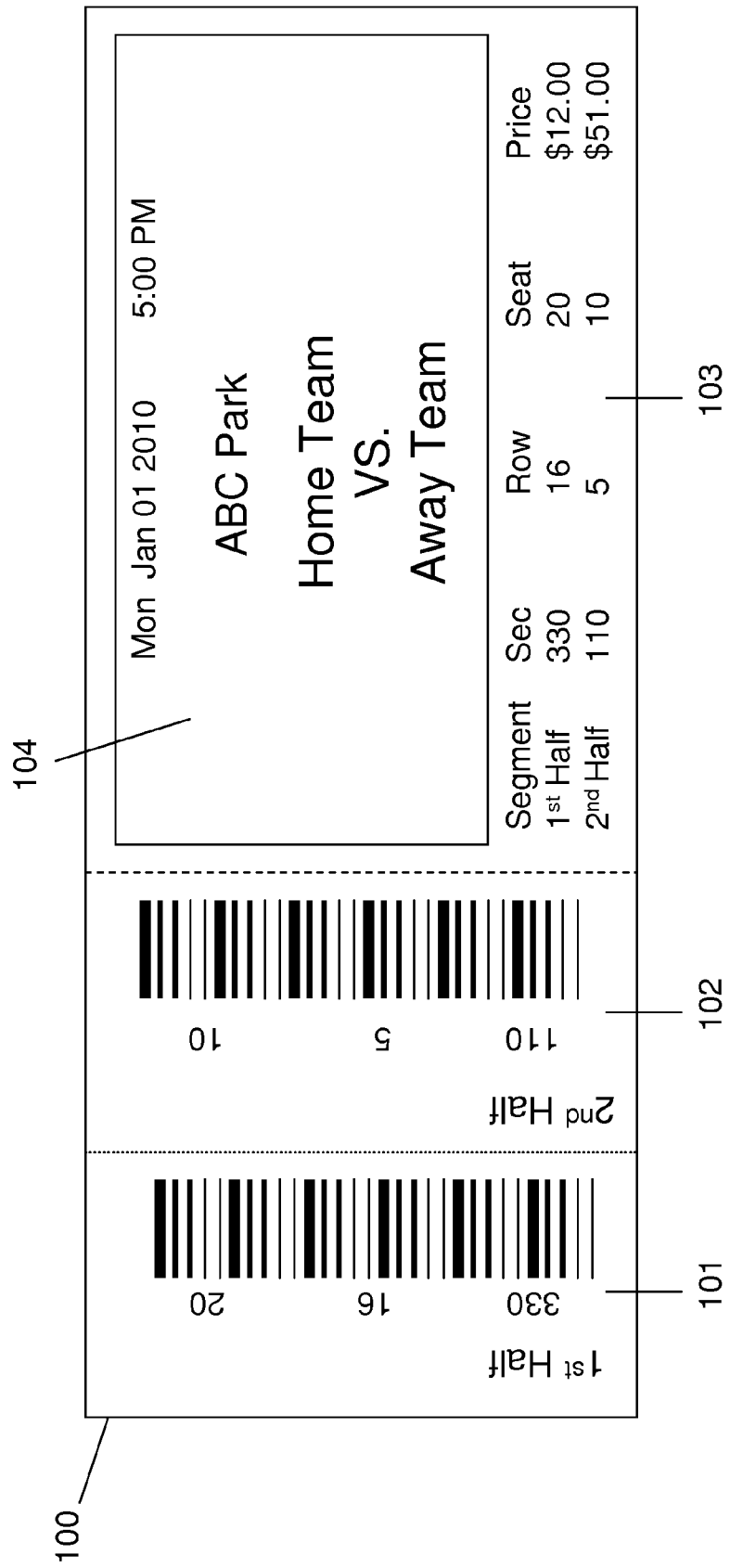
FIG. 1A is an illustration of a ticket (100) for an event in accordance with one embodiment.

The claimed subject matter may be embodied as a method, system, or computer program product. Accordingly, the claimed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the claimed subject matter may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the claimed subject matter can be written in an object oriented programming language such as Java, Smalltalk, C++ or the like. However, the computer program code for carrying out operations of the claimed subject matter may also be written in conventional procedural programming languages, such as the "C" programming language or similar programming languages. The program code may execute entirely on device, partly on a device, as a stand-alone software package, partly on the device and partly on a remote device or entirely on the remote device or server. In the latter scenario, the remote device may be connected to the device through a local area network (LAN) or a wide area network (WAN), or the connection may be made to an external device (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The claimed subject matter is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1A is an illustration of a segmented ticket (100) for an event in accordance with one embodiment. The segmented ticket (100) can include event information (104) typically found on a ticket which provides descriptive information about the event. The information can include but is not limited to the date, time, geographical location, venue, subject, description, title, or the competing entities. For example, the competing entities can be the home team versus the away team. The segmented ticket (100) can also include an admission criteria section (103) with details related to the segments such as a location, an area, a section, a row, a seat, a ticket number, or a price and often will include a barcode or other machine-readable representation of data representing the entire event or details specifically related to the locations that can be occupied by each ticket segment.

The segmented ticket (100) can be used to enter any of the one or more locations (103) specified by each of the ticket segments for the specified event segment. The segmented ticket can also include perforated or attached sections such as (101) and (102) that can be torn off and collected or scanned. These sections (101) and (102) can include one or more machine readable codes such as a bar code to verify the authenticity of the ticket segment.

For example, the segmented ticket as shown (100), grants access to section number 330, row 16, and seat 20 for the first half of an event (101). After the event (104) progresses to the second half, the first ticket segment becomes invalid and the second ticket segment at section number 110, row 5, seat 10, for the second event segment can be accessed (102). Each ticket segment can have a different price.

As used herein, the segmented ticket (100) can be a physical or electronic ticket. The electronic ticket can be implemented within any type of hardware including, but not limited to, a magnetic disk, an optical disk, a semiconductor memory, a digitally encoded plastic memory, a holographic memory, or any other recording medium. Further, access to the locations (103) specified by the ticket segment can be allowed or denied. Further, the machine readable codes (101) and (102) can use one or more encryption mechanisms to protect stored information from unauthorized access.

Figure 1B:
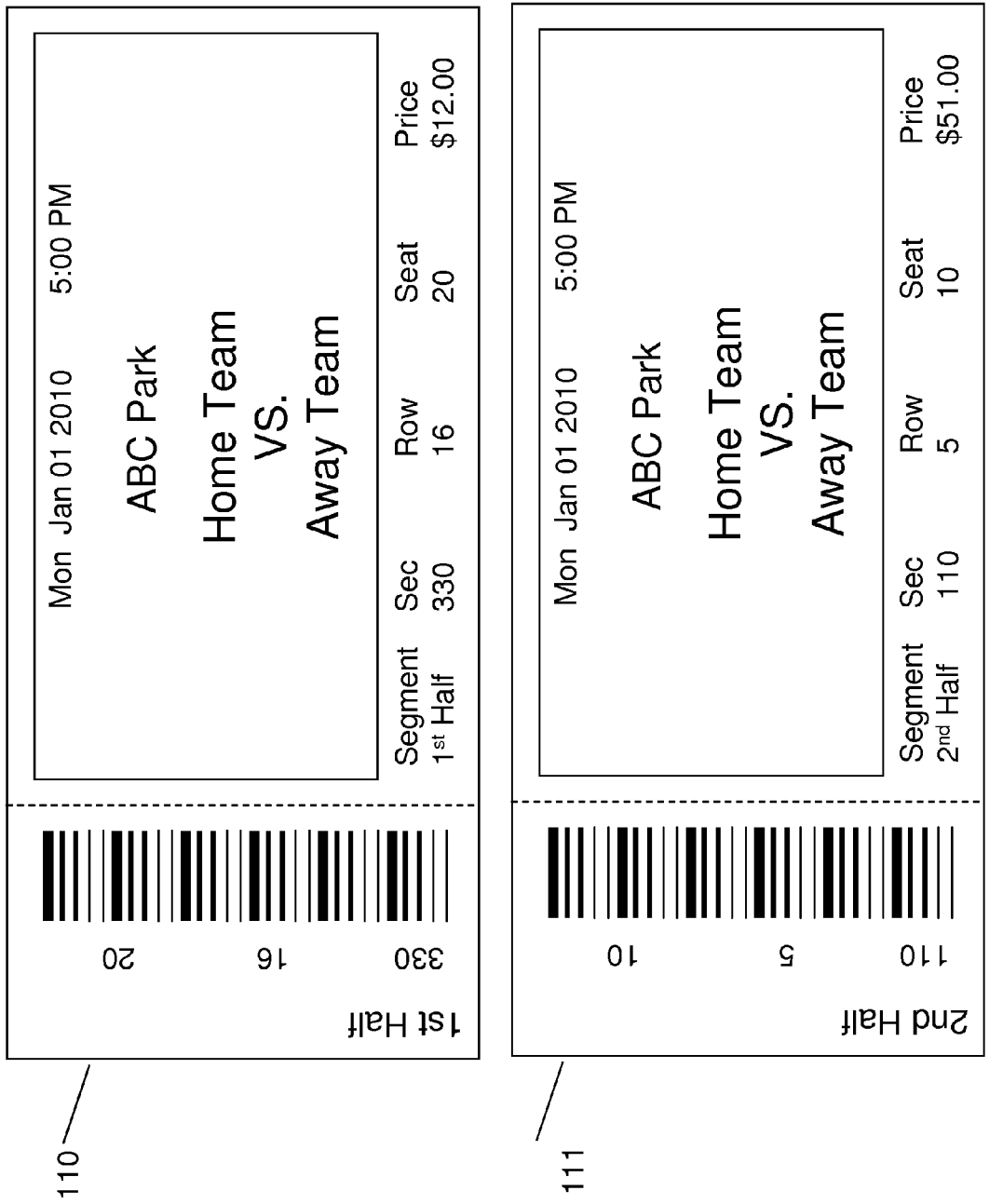
FIG. 1B is an illustration of two ticket segments (110) and (111), for an event.

In another embodiment, the ticket segments can be physically separate from each other. FIG. 1B is an illustration of two ticket segments (110) and (111). Each ticket segment corresponds to a segment of the event.

Figure 2:
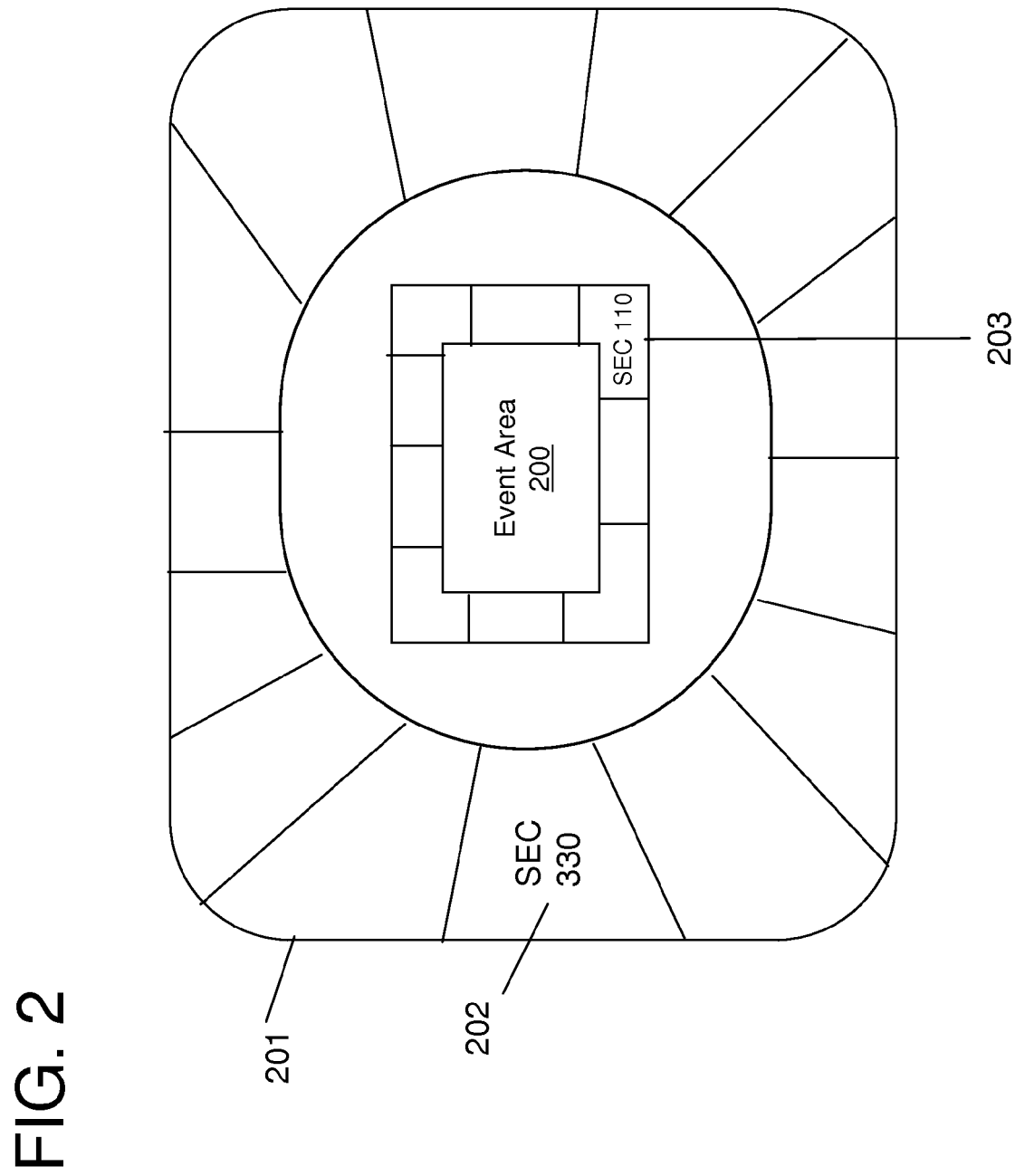
FIG. 2 is an illustration of an example event venue (200).

FIG. 2 is an illustration (201) of a venue. The venue is divided into sections. The event area (200) is where the event is performed. Sections closer to the event area (203) can be more desired and can be more expensive than sections which are further away from the event area (202). For example, a ticket located in section number 110 (203) can be more expensive than a ticket located in section 330 (202).

In accordance with one embodiment, each ticket segment can have an associated price. The price of each ticket segment can be set based on a value, a proportional price, or a demand. For example, an arbitrary value can be assigned to each ticket segment such as $79. The proportional price can be determined by dividing a ticket price by the number of event segments for the event or by dividing the total event time by a time for the event segments. For example, if the price was set proportionally to the number of event segments of the event, a ticket priced at $100 for an event with two segments can have two ticket segments each with a price of $50 ($100 total ticket price/2 the number of event segments). Alternatively, if the price was set proportionally to the time for the event segment, and the first event segment only lasted one fourth as long as the second event segment, then the price of the event segments can be $25 and $75, respectively. Demand can be calculated using historical, social, anticipated, and current analysis.

Figure 3:
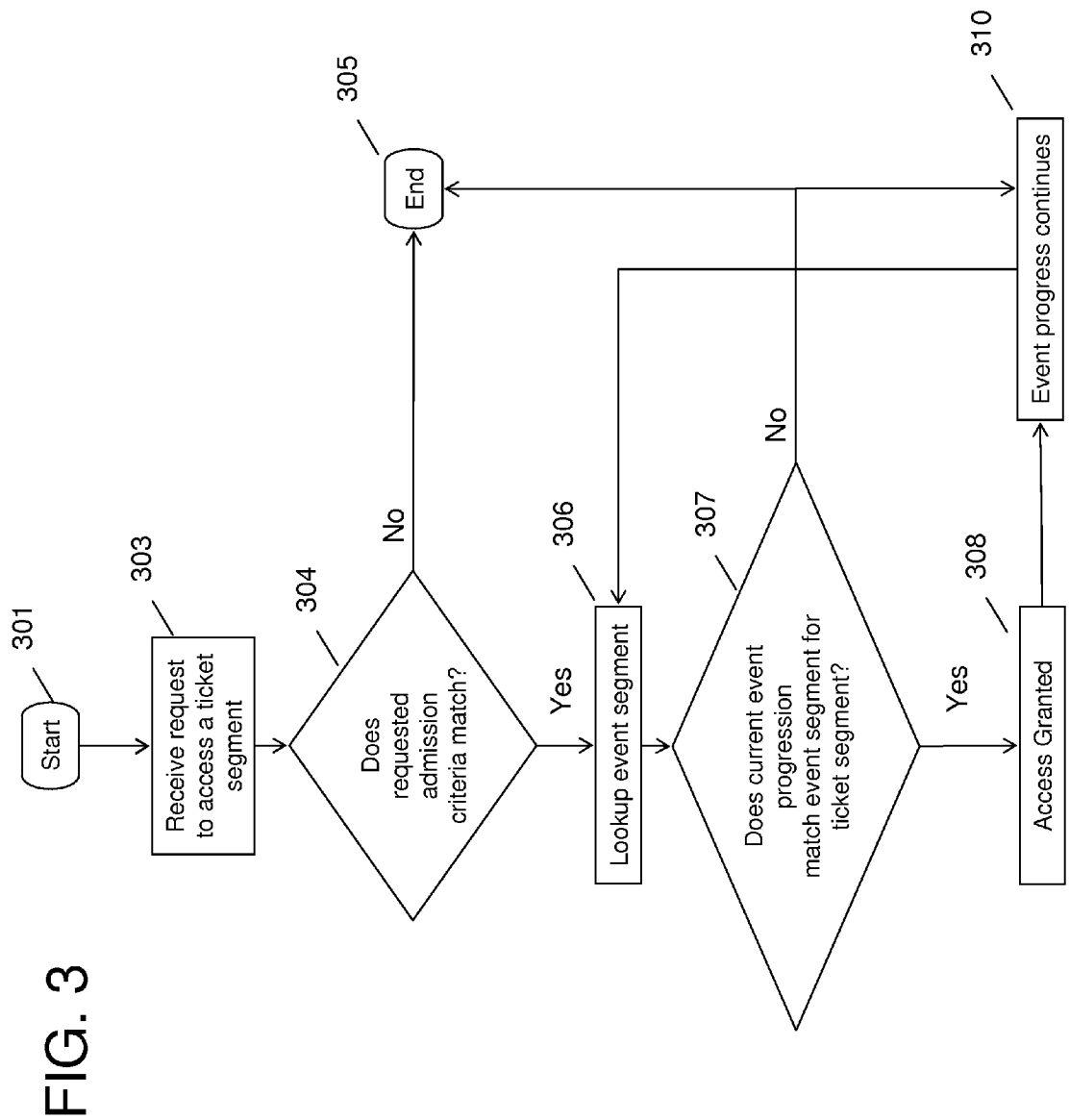
FIG. 3 is flowchart (301) of a process taken to allow or deny access to a location as defined by a ticket segment in accordance with one embodiment.

FIG. 3 is a flowchart (301) of a process taken to allow or deny access to a location as defined by a ticket segment in accordance with one embodiment. A request is received (303) to access a location as defined for a ticket segment. The admission criteria of the requested ticket segment are compared to the access location requested (304). If the admission criterion for the requested location does not match the admission criteria as defined for the ticket segment, access is not granted (305). If the admission criterion for the requested location matches the admission criteria for the ticket segment, then the event segment is retrieved (306).

In the flowchart (306), the lookup mechanism can use an electronic query result or a manual lookup of the event segment. For example, the manual lookup can be done by observing current event progress displayed on a score board. Once retrieved, the current progression of the event can be compared against the event segment associated with the ticket segment (307). If the progression of the event matches the event segment associated with the ticket segment, then access is granted (308). As the event progresses (310), the event progress information can be looked up again (306) and the flow continues as described previously.

If the event segment for the ticket segment does not match the event progress, then access is denied (305) and the ticket segment can be compared as the event progresses (310).

In another embodiment, the lookup of the event segment (306) and progress information (307) can occur before, or during the admission criteria comparison (304).

For example, an individual might want to have access to a ticket segment in section 110, row 5, and seat 10 for the second event segment. The individual approaches an usher assigned to section 110 and shows the usher her ticket segment. The ticket segment contains admission criteria information about access to section 110, row 5, and seat 10 in the second half of the event. The usher can then compare the individual's ticket segment to the current event progress. If it is the second half, then the individual is granted access to the section and proceeds to her assigned seat in row 5, seat 10.

Figure 4:
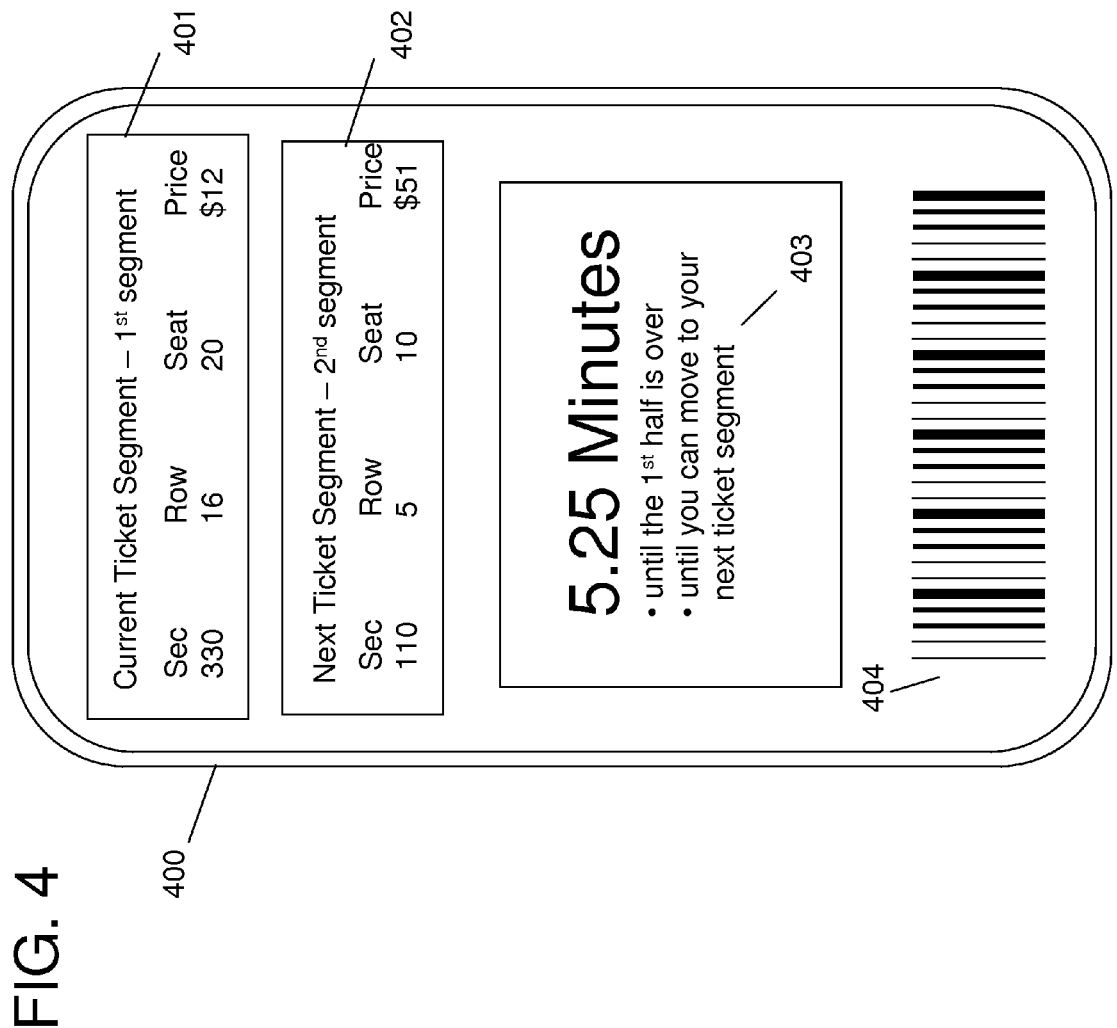
FIG. 4 is an illustration of a device (400) displaying ticket segments to an event in accordance with an embodiment.

FIG. 4 is an illustration of a device (400) displaying ticket segments to an event in accordance with one embodiment of the claimed subject matter disclosed herein. The current ticket segment (401) can be displayed based on information about the current progress of the event. Additionally, the device can display one or more next ticket segments (402) based on the current progression of the event and the number of event segments that remain.

The device can also display event progress information (403) such as the remaining time for the current ticket segment or current event progress information. Additionally, the display can include one or more machine readable codes (404).

A set of ticket segments can be filtered for display, purchase or distribution. The ticket segment filtering rules can meet a number of conditions such as a desired perspective, event segment, amount of time, set of admission criteria, number of grouped ticket segments, or a price. Grouped ticket segments are ticket segments within a close proximity to one another. For example, an individual might want to sit within 20 feet of the event area, find a ticket segment for the third period of the event, find a ticket segment they can sit in for at least 30 minutes, sit in row 5 of section 110, find five seats together in section 110, or spend around $50 on a ticket segment. In another example, an individual attending a basketball game might want to change their seat as teams change sides at the half. Using the described embodiment, a desired perspective can be satisfied for the individual. In yet another example, an individual attending a concert may wish to watch the opening act in the front row and then move back into a less desirable or less expensive location for the main act.

Figure 5:
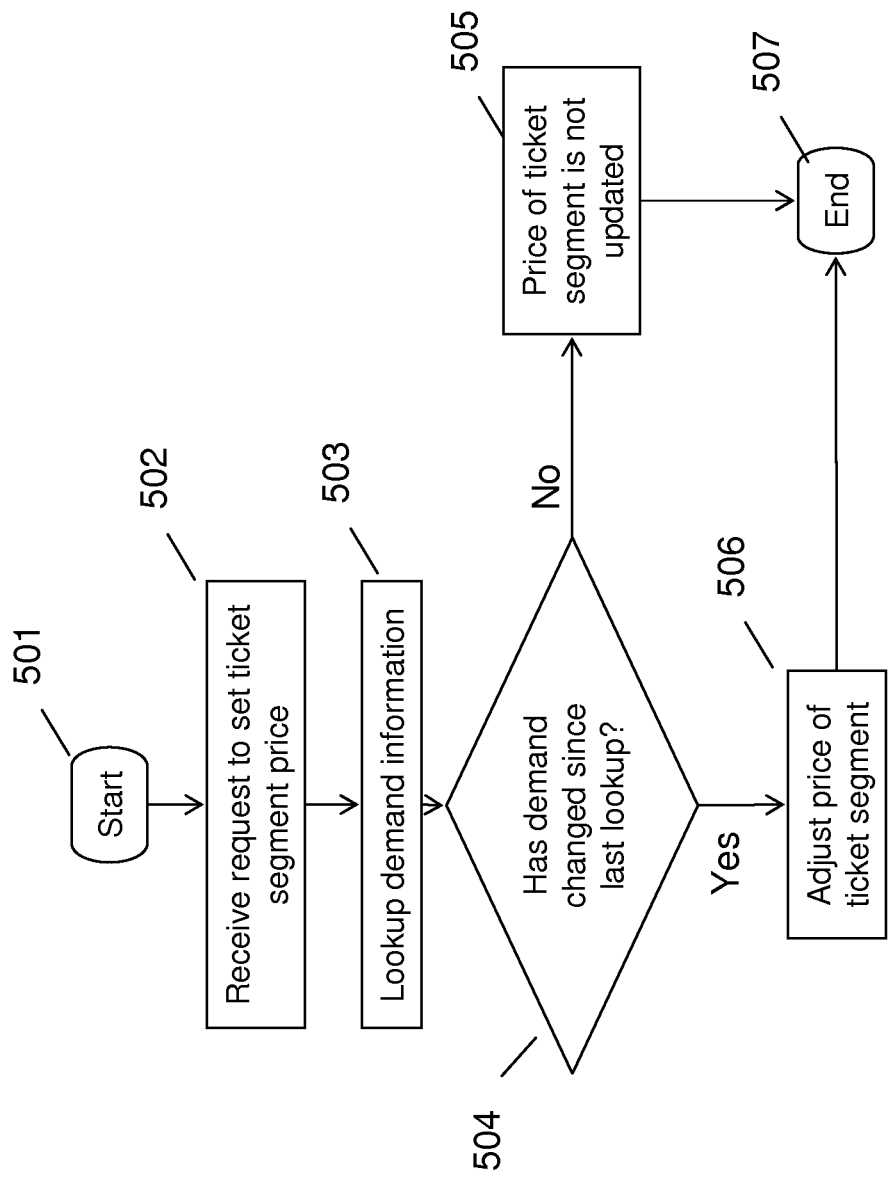
FIG. 5 is a flowchart (501) for specifying a method to determine the price of a ticket segment based on historical and social data in accordance with one embodiment.

FIG. 5 is a flowchart (501) for specifying a method to determine the price of a ticket segment based on demand in accordance with one embodiment. A request is received to set the price for a ticket segment (502). The demand information is then gathered (503). Demand can be calculated using historical, social, anticipated, or current analysis. Historical records can include but is not limited to similar events that were performed in the past. Social data can include but is not limited to social networking popularity such as the number of times the event is mentioned, number of fans associated with the event or the event performers, or recent news articles. Once the information is retrieved the system can determine whether the demand has changed since the last lookup (504). If the demand for the ticket segment has not changed since the last lookup then the price of the ticket segment is not updated (505) and the program ends (507). If the demand has changed since the last lookup, the price of the ticket segment is adjusted (506) accordingly.

For example, suppose a football game is scheduled between team A and team B. Historically, team A and team B have attracted large, sold out crowds and the competition to get the ticket segments was high. Based on this historical demand data, the price for ticket segments to attend the event can be increased.

In another embodiment, the price of the ticket segments can be dynamically adjusted based on the progress of the event, an event factor, a demand, or a value. A comparison can be done to determine if the ticket segment's price needs to be adjusted. As the event progresses, analysis continues and the ticket segment price can be further updated accordingly.

In one example, suppose the event is a football game. If the score of the game is close then the price of the seats closer to the field can increase, if the scoring gap increases the demand to be closer to the field can decrease and therefore the price of the location of the ticket segment can dynamically adjust as the event progresses. In yet another example, in a sporting event such as basketball where overtime is possible, if the two teams are tied or the score is close, the second half ticket segment can have a higher potential value since individuals sitting in those seats can likely have a more exciting experience. Due to the demand for the second half, the price of the second half ticket segment can be more than the price of the first half ticket segment in the same seat. In yet another example, suppose a ticket costs $200. If the second half is determined to have a higher demand than the first half, the ticket can be priced at $90 for the first half ticket segment and $110 for the second half ticket segment. In an alternative embodiment the price of the sum of the ticket segments can be higher than the full price of the ticket. For example, with the same ticket described in the previous example, the first half ticket segment can be priced at $100 and the second half ticket segment can be priced at $150 for a total ticket price of $250 which is more than the cost of the full priced ticket.

Figure 6:
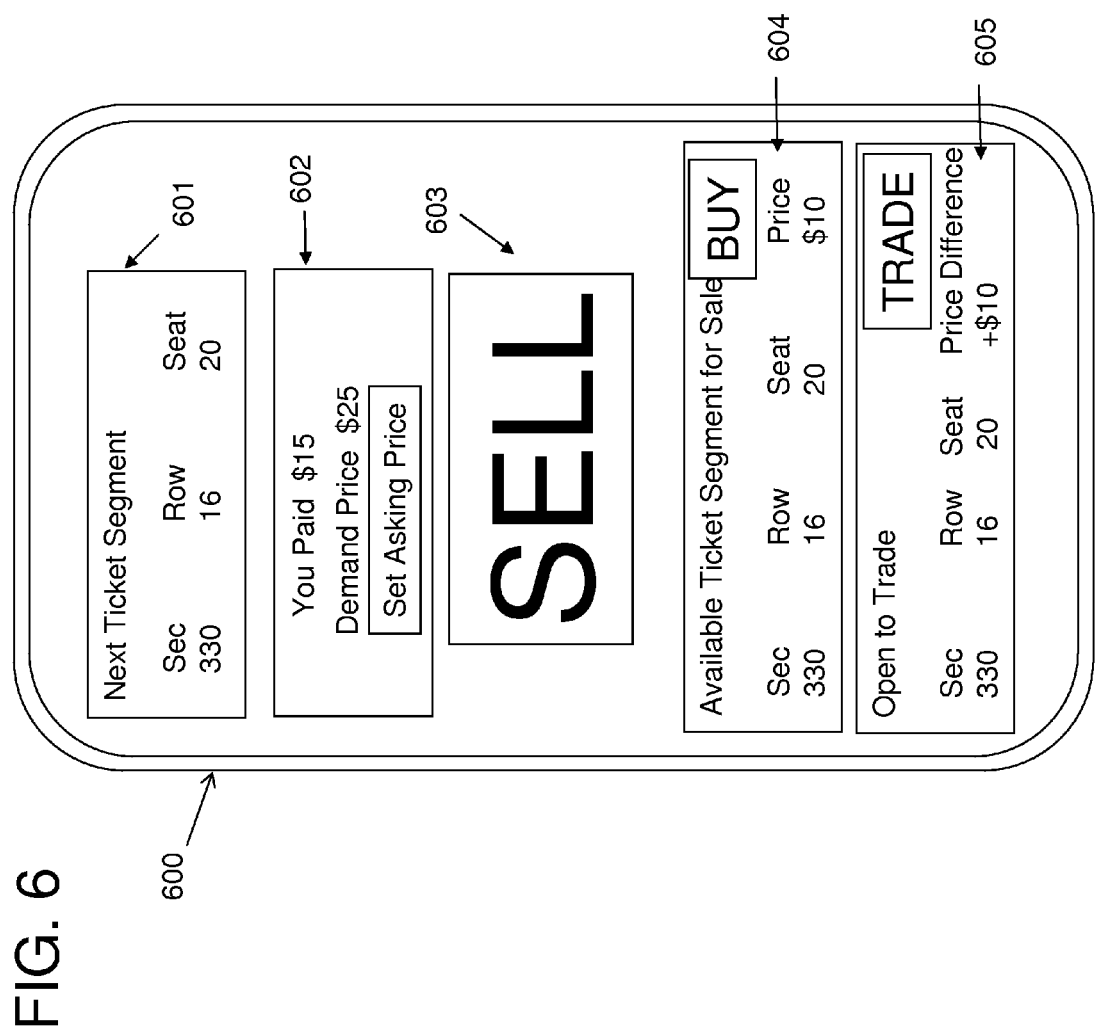
FIG. 6 is an illustration (600) for the dynamic demand of one or more ticket segments in accordance with one embodiment.

FIG. 6 is an illustration (600) for the dynamic demand of one or more ticket segments in accordance with one embodiment. The value of the ticket segments can dynamically change as the event progresses. A device can display the current value of the current ticket segment and remaining ticket segments (600). The display can be comprised of a next ticket segment (601), an area to view the paid price as well as the potential demand price (602), and an option to sell (603), buy (604), or trade (605).

For example, as an event progresses, a ticket segment might increase in price as the demand for the ticket segment increases. Therefore, the ticket segment can be adjusted by selling the ticket segment (603) or buying a better or worse valued ticket segment (604). Alternatively, the ticket segment can be traded (605).

Figure 7:
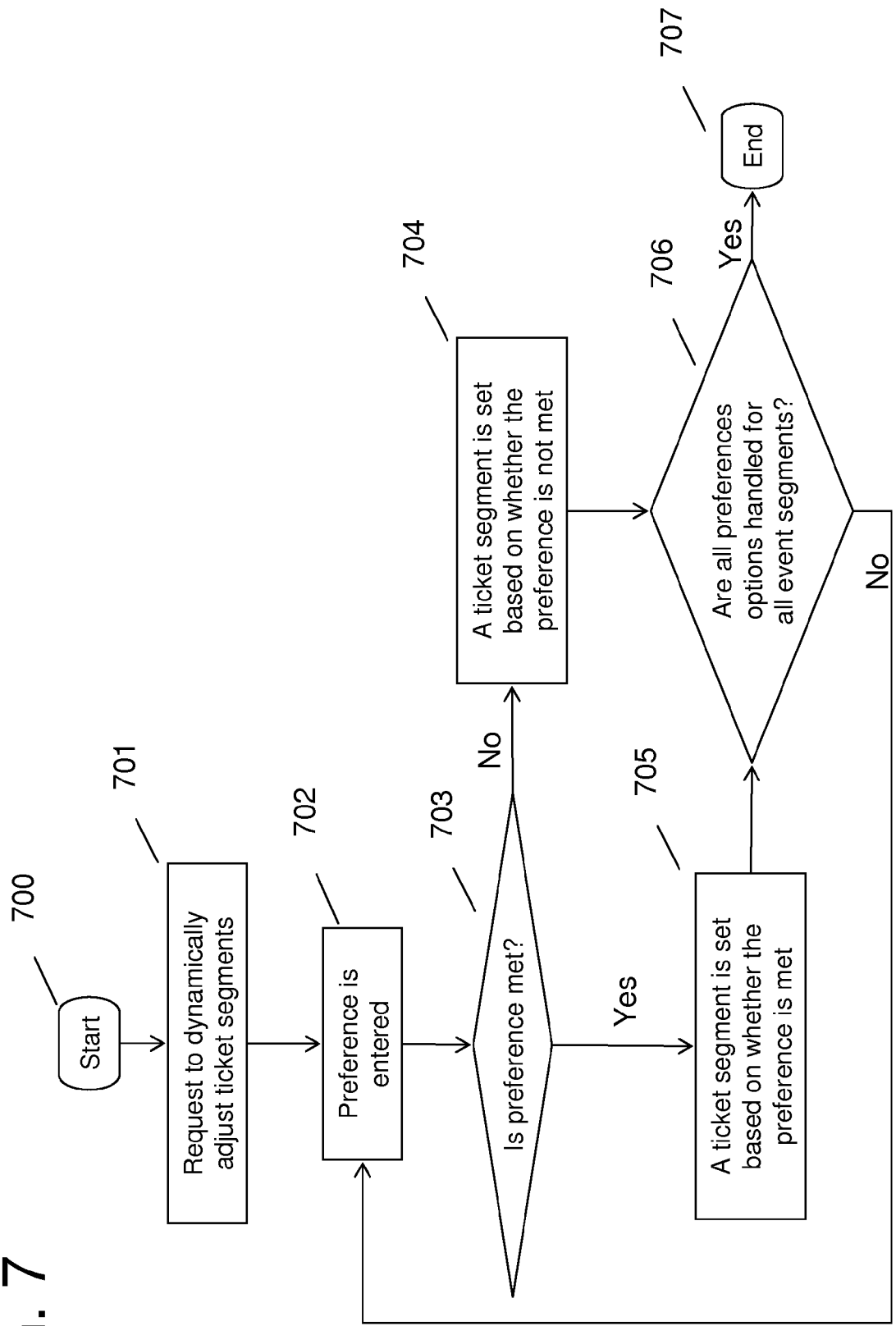
FIG. 7 is a flowchart (700) for specifying a method to adjust a ticket segment based on satisfying a request in accordance with one embodiment.

FIG. 7 is a flowchart (700) for specifying a method to adjust a ticket segment based on satisfying a request in accordance with one embodiment. The ticket segment requested can be specified based on one or more event factors. Event factors can include but are not limited to a time of day preference, a location preference, a score preference, a desired number of grouped ticket segments, an injury preference, and an outside factor preference. The one or more preferences are entered (702). During the selection of the ticket segments, one or more ticket segments can be chosen based on whether the preference is met (704) or whether the preference is not met (705). Once all preference options are handled for all event segments (706) then the selection process can end (707). If more preferences are requested then the process can continue by selecting additional preferences (702).

For example, an individual may have a personal conflict which requires them to leave at 7 pm from a baseball game they are currently attending. Using this embodiment the individual can set a preference that if after any inning, the time is after 6:30 pm then they would like to sell their remaining ticket segments on the assumption that they will be leaving. If after the $5^{th}$ inning it is only 5:30 p.m., the remaining ticket segments will not be sold. If after the $6^{th}$ inning it is 6:35 p.m., the remaining ticket segments are listed for sale. In the previous example there are only two options for the individual, stay or leave. Both preference options are handled for all event segments.

Figure 8:
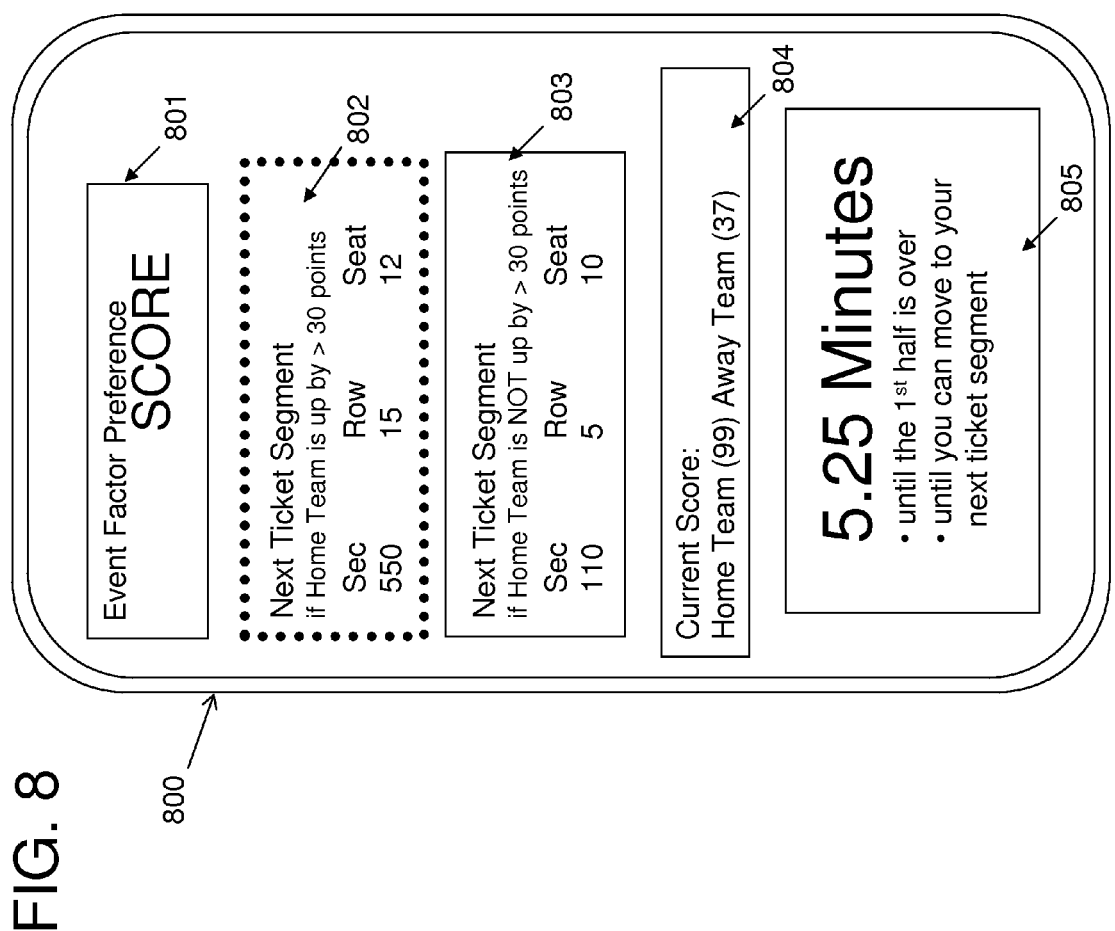
FIG. 8 is an illustration (800) for the dynamic display of one or more next ticket segments based on the event progression in respect to one or more preferences in accordance with one embodiment

FIG. 8 is an illustration (800) for the dynamic display of one or more next ticket segments based on the event progression in respect to one or more event factors in accordance with one embodiment. A display area can show the event factor the next ticket segment is based on (801), the possible ticket segments (802) (803) and the event factors that would result in the ticket segment being adjusted. Additionally, the device can display the current event progression and event details (804) (805). The next ticket segment that has a higher probability of satisfying the preferences can be highlighted (802). Highlight can consist of but is not limited to changes in color, font, style, outline, order, animation, and size.

For example, suppose an individual sets an event factor preference for score (801) and only wants to sit in a higher demanded ticket segment during a basketball game if the home team is not up by greater than thirty points (803). If the home team is up by more than thirty points, then the individual no longer wants to watch as the second string players take the court (802). Based on the current score information (804), it can be seen that the home team has a score of 99 and the away team has a score of 37. Since the difference between 99 and 37 is 62 points, which is greater than 30, it is more likely that the next ticket segment for the individual is the lesser demanded ticket segment (802) and that ticket segment is therefore highlighted.

In another embodiment of the claimed subject matter, a notification can be displayed or sent based on a ticket segment adjustment. The notification can include a status and a message. The message can be in the form of a short message service (sms), an email, a voice message, a status update, or a display message. The status can be that of success, of failure, or a probability that ticket segment will be adjusted in the future. For example, if a user wants to dynamically adjust a ticket segment only if a desired score is met, a notification can show the individual the likelihood that the score will be met, such as a 75% chance the ticket segment will be adjusted based on the current score.

The diagrams in FIGS. 1-8 illustrate the architecture, functionality, and operation of possible implementations of systems, methods, and computer program products according to various embodiments of the claimed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the claimed subject matter has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for segmenting, by a processor, a ticket for an entire duration of an entertainment event, comprising:
   determining, by the processor, before the entertainment event begins, a set of break points for the event, the set of break points segmenting the entire duration of the entertainment event into at least two event segments;
   segmenting, by the processor, before the entertainment event begins, the ticket into a ticket segment for each of the at least two event segments, wherein the at least two ticket segments in combination grant admission to a hosting venue for the entire duration of the entertainment event; and
   associating, by the processor, before the entertainment event begins, the ticket segment with the event segment and the ticket, the ticket segment having a set of admission criteria comprising at least one of the following: a location, an area, a date, a time, a section, a row, a seat, a ticket number, and a machine readable code;
   wherein the entertainment event includes at least two competing entities, and the competing entities remain the same throughout the duration of the entertainment event.

2. The method of claim 1, further comprising at least one of the following: a paper ticket, and an electronic ticket.

3. The method of claim 1, further comprising:
   receiving, by the processor, a request to access a location as defined by the ticket segment;
   determining, by the processor, whether the event segment and a set of admission criteria specified for the ticket segment are fulfilled;
   in response to determining, by the processor, that the event segment and the set of admission criteria are fulfilled, allowing access to the location as defined by the ticket segment for the event segment; and
   in response to determining, by the processor, that the event segment and the set of admission criteria are not fulfilled, denying access to the location as defined by the ticket segment for the event segment.

4. The method of claim 3, further comprising comparing, by the processor, a current progression of the event against the event segment associated with the ticket segment, the current progression of the event comprising at least one of the following: a manual, and an electronic comparison.

5. The method of claim 1, wherein a price is associated with the ticket segment comprising at least one of the following: a value price, a proportional price, and a demand price for the ticket segment.

6. The method of claim 5, further comprising:
   dynamically adjusting, by the processor, the price of the ticket segment based on at least one of the following: a time of day preference, a location preference, a score preference, a desired number of grouped ticket segments, and an injury preference.

7. The method of claim 1, further comprising:
   receiving, by the processor, a request for the set of ticket segments; and
   filtering, by the processor, the set of ticket segments based on a set of ticket segment filtering rules, the set of ticket segment filtering rules meeting at least one of the following conditions: a desired perspective, a desired event segment, a desired amount of time, a desired set of admission criteria, a desired price, a desired number of grouped ticket segments, and a desired event factor.

8. The method of claim 1, further comprising:
   receiving, by the processor, a request to adjust the ticket segment;
   determining, by the processor, whether at least one ticket segment is available based on the request; and
   adjusting, by the processor, the ticket segment.

9. The method of claim 8, wherein adjusting the ticket segment includes: performing at least one of the following: selling the ticket segment, trading the ticket segment, and purchasing the ticket segment.

10. The method of claim 8, further comprising notifying, by the processor, of the adjustment comprising a status and a message, the message comprising at least one of the following: a short message service, a text message, an email, a voice, a status update, or a display message and the status comprising at least one of the following: a success, a failure, and a probability of a future adjustment.

11. A computer program product for segmenting, by a processor, a ticket for an entire duration of an entertainment event, comprising:
   a non-transitory computer-readable storage medium; and
   a computer-readable program code, stored on the non-transitory computer-readable storage medium for execution on a processor, for:
   determining, by the processor, before the entertainment event begins, a set of break points for the event, the set of break points segmenting the entire duration of the entertainment event into at least two event segments;
   segmenting, by the processor, before the entertainment event begins, the ticket into a ticket segment for each of the at least two event segments, wherein the at least two ticket segments in combination grant admission to a hosting venue for the entire duration of the entertainment event; and
   associating, by the processor, before the entertainment event begins, the ticket segment with the event segment and the ticket, the ticket segment having a set of admission criteria comprising at least one of the following: a location, an area, a date, a time, a section, a row, a seat, a ticket number, and a machine readable code;

wherein the entertainment event includes at least two competing entities, and the competing entities remain the same throughout the duration of the entertainment event.

12. The computer program product of claim 11, further comprising at least one of the following: a paper ticket, and an electronic ticket.

13. The computer program product of claim 11, further comprising:
receiving, by the processor, a request to access a location as defined by the ticket segment;
determining, by the processor, whether the event segment and a set of admission criteria specified for the ticket segment are fulfilled;
in response to determining, by the processor, that the event segment and the set of admission criteria are fulfilled, allowing access to the location as defined by the ticket segment for the event segment; and
in response to determining, by the processor, that the event segment and the set of admission criteria are not fulfilled, denying access to the location as defined by the ticket segment for the event segment.

14. The computer program product of claim 13, further comprising comparing a current progression of the event against the event segment associated with the ticket segment, the current progression of the event comprising at least one of the following: a manual, and an electronic comparison.

15. The computer program product of claim 11, wherein a price is associated with the ticket segment comprising at least one of the following: a value price, a proportional price, and a demand price for the ticket segment.

16. The computer program product of claim 15, further comprising:
dynamically adjusting, by the processor, the price of the ticket segment based on at least one of the following: a time of day preference, a location preference, a score preference, a desired number of grouped ticket segments, and an injury preference.

17. The computer program product of claim 11, further comprising:
receiving, by the processor, a request for the set of ticket segments; and
filtering, by the processor, the set of ticket segments based on a set of ticket segment filtering rules, the set of ticket segment filtering rules meeting at least one of the following conditions: a desired perspective, a desired event segment, a desired amount of time, a desired set of admission criteria, a desired price, a desired number of grouped ticket segments, and a desired event factor.

18. The computer program product of claim 11, further comprising:
receiving, by the processor, a request to adjust the ticket segment;
determining, by the processor, whether at least one ticket segment is available based on the request; and
adjusting, by the processor, the ticket segment.

19. The computer program product of claim 18, wherein adjusting the ticket segment includes: performing at least one of the following: selling the ticket segment, trading the ticket segment, and purchasing the ticket segment.

20. The computer program product of claim 18, further comprising notifying, by the processor, of the adjustment comprising a status and a message, the message comprising at least one of the following: a short message service, a text message, an email, a voice, a status update, or a display message and the status comprising at least one of the following: a success, a failure, and a probability of a future adjustment.

* * * * *